United States Patent [19]

Bernat

[11] 4,218,041
[45] Aug. 19, 1980

[54] LOW NOISE SLIDE VALVE

[75] Inventor: Georg Bernat, Menden, Fed. Rep. of Germany

[73] Assignee: IT&T Industries, Inc., New York, N.Y.

[21] Appl. No.: 861,576

[22] Filed: Dec. 19, 1977

[30] Foreign Application Priority Data

Dec. 22, 1976 [DE] Fed. Rep. of Germany ....... 2658024

[51] Int. Cl.³ ...................... F16K 11/06; F16K 47/02
[52] U.S. Cl. ................................. 251/127; 137/625.4
[58] Field of Search .............................. 251/118, 127; 137/625.3, 625.4

[56] References Cited

U.S. PATENT DOCUMENTS

| 1,064,343 | 6/1913 | Kennedy | 138/77 |
| 2,089,224 | 8/1937 | Peterson et al. | 25/118 |
| 3,433,264 | 3/1969 | Parkison | 251/127 X |
| 3,920,043 | 11/1975 | Fowell | 251/118 X |
| 4,004,615 | 1/1977 | Stern et al. | 138/37 X |
| 4,037,818 | 7/1977 | Soderberg et al. | 251/127 X |

Primary Examiner—Arnold Rosenthal
Attorney, Agent, or Firm—James B. Raden; Donald J. Lenkszus

[57] ABSTRACT

A slide valve of the type used in mixing faucets includes a flow channel recess having a plurality of closely spaced ridges or recesses in its bottom wall to reduce noise.

5 Claims, 7 Drawing Figures

LOW NOISE SLIDE VALVE

BACKGROUND OF THE INVENTION

1. Field of the Invention

The invention relates generally to a slide valve element of the type used in faucets to regulate the mixture ratio and/or the volume of fluids and particularly to an improved noise reduced slide valve.

Faucets of the type in which the invention may be employed typically have a valve body formed with a pair of passages arranged for connection to hot and cold water lines. A third passage is arranged to communicate with a spout on the like for the valve discharge. A mixing valve within the valve body comprises a valve seat fixed within the body and a slide valve positioned in sliding engagement with a surface of the valve seat. The valve seat has two inlet apertures in communication with the hot and cold water passages and a third outlet aperture in communication with the outlet passage. The slide valve has a flow channel recess or overflow passage in its surface arranged so that movement of the slide valve controls communication between the inlet and outlet apertures.

One previously known problem with such valve arrangements is that they are susceptible to the development of noises which may make the faucet commercially unacceptable. Various solutions to this problem have been previously provided. One solution taught by German Patent DT-OS No. 2,356,211 requires securing a flexible element filled with air and screener plates in the overflow passage.

However, this solution is relatively expensive and further, the flexible body filled with air is exposed to solid particles entrained in the water so that functional failure and damage may occur after extended use.

Another solution taught by U.S. Pat. No. 3,893,482 utilizes a plurality of overlapping screens disposed within the flow channel recess.

This solution requires additional assembly steps and therefore also appears to be relatively expensive.

U.S. Pat. No. 3,433,264 teaches a noise reducing arrangement for a slide valve similar to that of the present invention. The noise reducing arrangement of this patent entails forming a plurality of ridges in the side-walls of the flow channel recess.

SUMMARY OF THE INVENTION

A low-noise slide valve in accordance with the principles of the invention includes a flow channel recess having an irregular bottom surface of relatively closely formed ridges and recesses.

Further in accordance with the invention, the bottom surface of the recess is formed with corrugations transverse to the direction of fluid flow.

Still further in accordance with the invention, the irregular bottom surface is provided by means of closely spaced projections into the recess or by means of blind bores in the bottom surface of the recess.

BRIEF DESCRIPTION OF THE DRAWINGS

A better understanding of the invention may be had from the following detailed description of several illustrative embodiments taken in conjunction with the drawings in which like reference numerals refer to like parts and in which.

DESCRIPTION OF THE PREFERRED EMBODIMENTS

Figure 1:
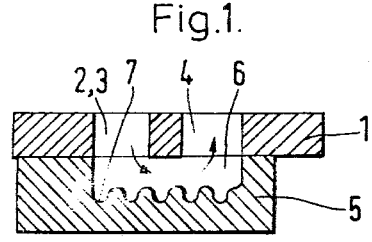
FIG. 1 illustrates in cross-section a slide valve in accordance with the invention in cooperation with a valve seat.
Figure 2:
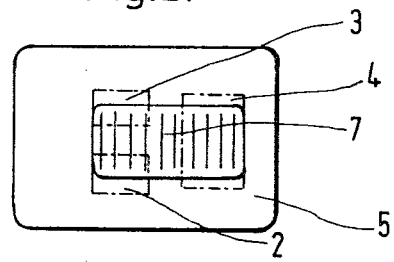
FIG. 2 is a plane view of the structure of FIG. 1.

FIGS. 1 and 2 show a schematic representation of a valve seat 1 which is adapted to be rigidly anchored in a faucet seat 1 which is adapted to be rigidly anchored in a faucet housing of a mixing faucet of a type known in the art. The valve seat 1 includes inflow apertures 2 and 3 for hot and cold water and an outflow aperture 4 for the mixed water. A slide valve is positioned in sliding engagement on the valve seat 1. An overflow passage 6 is recessed into the slide valve surface in contact with the valve seat 1. The overflow passage 6 serves to connect the inflow apertures 2 and 3 to the outflow aperture 4 to a greater or lesser extent depending upon the position of the slide valve in relation to the baseplate. To reduce noise, the bottom 7 of the overflow passage 6 is of corrugated form transverse to the direction of flow.

Figure 3:
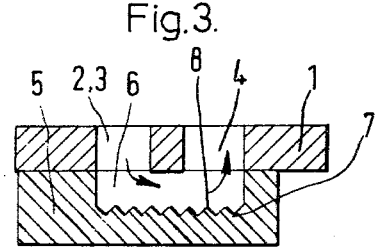
FIG. 3 illustrates the cross-section of a second slide vlave in accordance with the invention and a cooperating valve seat.
Figure 4:
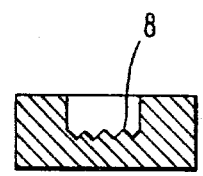
FIG. 4 is a side view cross-section of the slide valve of FIG. 3.
Figure 5:
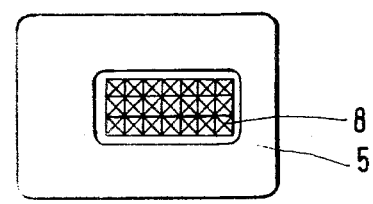
FIG. 5 is a top-planar view of the slide valve of FIG. 3.

The above description also applies to the embodiment shown in FIGS. 3, 4 and 5. However, to reduce noise, pyramid-shaped projections 8 are provided on the bottom 7.

Figure 6:
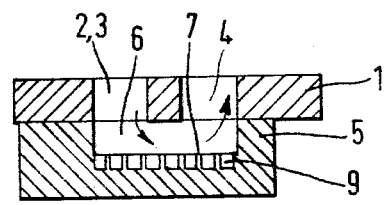
FIG. 6 illustrates a cross-sectional side view of a third slide valve in accordance with the invention in cooperation with a valve seat.
Figure 7:
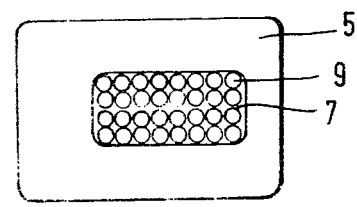
FIG. 7 is a top-planar view of the slide valve of FIG. 6.

In the embodiment shown in FIGS. 6 and 7, noise reduction is obtained by means of blind bores 9 arranged close to each other in the bottom 7 of the overflow passage 6.

Alternately, studs of cylindrical or conical form could also be provided, arranged close to each other in the overflow passage, on the bottom 7 (not shown in the drawings).

A reduction in the development of noise can also be obtained by providing longitudinal ribs in the direction of flow on the bottom 7 of the overflow passage.

What is claimed is:

1. A slide valve for controlling fluid flow comprising:
a first plate having a surface adapted to slidably engage a corresponding apertured surface of a valve plate to control the mixture ratio and/or discharge volume of liquids said first surface including a flow channel recess having an opening in said first surface, a bottom wall opposite said opening, and side walls intermediate said bottom wall and said first surface, said bottom wall including pluralities of integrally formed elevations and depressions in the direction of fluid flow, each of said pluralities of integrally formed elevations being spaced substantially the same distance from said first surface.

2. A slide valve in accordance with claim 1, wherein said integrally formed elevations comprise a plurality of closely spaced ridges integrally formed in said bottom wall and positioned transverse to the direction of fluid flow in said flow channel recess.

3. A slide valve in accordance with claim 1, wherein said plurality of integrally formed elevations comprises a plurality of projections into said flow channel recess, each of said projections being integrally formed in said bottom wall.

4. A slide valve in accordance with claim 1, wherein said plurality of integrally formed depressions comprises a plurality of closely spaced recesses, each of said recesses being integrally formed in said bottom wall.

5. A slide valve in accordance with claim 4, wherein said bottom surface includes a plurality of blind bores.

* * * * *